US006381536B1

(12) United States Patent
Satoh et al.

(10) Patent No.: US 6,381,536 B1
(45) Date of Patent: Apr. 30, 2002

(54) APPARATUS FOR GENERATING ROAD INFORMATION FROM STORED DIGITAL MAP DATABASE

(75) Inventors: Yoshihiro Satoh, Kanagawa; Hiroshi Saito, Yokohama, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/598,407

(22) Filed: Jun. 21, 2000

(30) Foreign Application Priority Data

Jun. 21, 1999 (JP) ........................................... 11-173642
May 24, 2000 (JP) ....................................... 2000-153065

(51) Int. Cl.[7] ............................................. G06F 165/00
(52) U.S. Cl. ........................ 701/208; 701/209; 340/995
(58) Field of Search ................................ 701/208, 207, 701/93, 211, 205, 209, 1, 36; 340/995, 990; 342/450, 451, 457

(56) References Cited

U.S. PATENT DOCUMENTS 5,359,529 A * 10/1994 Snider ........................ 701/207
5,508,931 A * 4/1996 Snider ........................ 701/207
6,029,111 A 2/2000 Croyle ....................... 701/207
6,141,619 A * 10/2000 Sekine ........................ 701/93
6,163,741 A * 12/2000 Matsuda et al. ............... 701/1

FOREIGN PATENT DOCUMENTS

JP 8-194893 7/1996

* cited by examiner

*Primary Examiner*—Jacques H. Louis-Jacques
*Assistant Examiner*—Tuan C To
(74) *Attorney, Agent, or Firm*—Foley & Lardner

(57) ABSTRACT

A road information generating apparatus has a stored digitized map database having data identifying roads on a route. The roads of the map database are stored as road segments each having endpoints. The apparatus cancels data defining selected road segments that fall outside of a predetermined window about a predetermined circle approximating a predetermined road curve. The apparatus determines circles each approximating a portion of unselected road segments. The apparatus compares a radius of each of the circles with a predetermined radius value. The apparatus produces road information on acute curve in response to result of comparing the radius of each curve with the predetermined radius value.

14 Claims, 19 Drawing Sheets

APPARATUS FOR GENERATING ROAD INFORMATION FROM STORED DIGITAL MAP DATABASE

FIELD OF THE INVENTION

The present invention relates to an apparatus for generating road information on a route over which a vehicle may move.

BACKGROUND OF THE INVENTION

The term "road information" is herein used to mean information on curve of a road that may be used to assist the river of a vehicle to navigate. The term "route" is herein used to mean a course of travel from a current position of a vehicle to a desired destination.

Navigational aids are useful to assist the driver of a vehicle in locating the vehicle's current position and for locating and moving to a desired destination. Current navigational aid is a video image of a map, which appears on a monitor and accurately reproduces the image of a road map. The current navigational aid uses a stored map database, i.e., a digital map. The map database has data identifying all roads or a road network of a route or an area over which a vehicle may move. The roads are stored as road segments each having endpoints. The roads are categorized by highways, major roads, access roads, local streets, etc. The term "road" is herein used to mean a highway, a major road, an access road and a local street. The vehicle that will be discussed may be a motor vehicle such as a car, a recreational vehicle (RV), a motorcycle, a bus, a truck or other type of vehicle primarily moveable over roads.

Current vehicle navigation systems may use GPS, such as an electromagnetic wave positioning system, to determine a vehicle's current position. They may use vehicle speed sensor, rate gyro and a reverse gear hookup to "dead reckon" the vehicle's current position from a previously known position. This method of dead reckoning, however, is susceptible to sensor errors, and therefore requires more expensive sensors for accuracy and dependability.

The driver may want to know road information on the route ahead while engaged in the task of driving. Such road information may be used in cruising control or a navigational aid.

JP-A 8-194893 discloses a technique to use a map database of a navigation system to determine whether or not a curve exists ahead. The map database includes point data, in terms of coordinates, each identifying a trailing endpoint of each of road segments with respect to a direction of travel, and link data each indicative of a length along one of the road segments. The point data do not contain information as to a radius of road curve of each of the road segments. This publication teaches processing the point data to obtain a road curve index, i.e., an azimuth angle, at each of trailing endpoints of the road segments. An initiation of a road curve is determined at a point when the absolute value of the road curve index exceeds a predetermined value. A completion of the curve is determined at a point when subsequently the absolute value of the road curve index drops below the predetermined value. The curve index of a measuring point is determined as an angle between two vectors, namely, a leading vector and a trailing vector. The leading vector terminates at the measuring point and the trailing vector originates at the measuring point. A sampling distance is determined. The leading vector originates at a point before the measuring point by the sampling distance along the road. The trailing vector terminates at a point ahead the measuring point by the sampling distance along the road. The radius of road curve at the measuring point is determined by calculating the following equation, $$R_n=L_n/[233\ \sin(\theta_n/2)]$$

where:

$R_n$ is radius of road curve at endpoint n, $L_n$ is sampling distance at endpoint n, and $\theta_n$ is road curve index at endpoint n.

The sampling distance $L_n$ is updated by the previous known radius of road curve $R_{n-1}$ calculated at the previous measuring point n−1. The endpoints are equidistant along a road at a predetermined distance. The sampling distance $L_n$ results from multiplying an integer with this predetermined distance.

This known technique proves to be fairly well inenvironment where a map database stores point data identifying equidistant endpoints. It would be desirable to improve the known technique such that it is capable of using a map database, which stores point data identifying variable distant endpoints. In such a map database, road segments defined by the endpoints become longer as the stretch of straightforward portion of a road network become longer.

SUMMARY OF THE INVENTION

Accordingly, a need remains to improve the known technique in movement toward versatile apparatus for generating road information ahead a vehicle.

An object of the present invention is to improve versatility of an apparatus for generating road information ahead of a vehicle.

According to one aspect of the present invention, there is provided an apparatus for generating road information on a route over which a vehicle may move, the apparatus comprising:

- a stored map database having data identifying roads on the route, said roads of said stored map database being stored as road segments each having endpoints; and
- an application unit to implement a circular arc approximation type logic, which, when rendered operable, cancels data defining selected road segments that fall outside of a predetermined window about a predetermined circle approximating a predetermined road curve, determines circles, each approximating a portion of non-selected road segments, compares a radius of each of said circles with a predetermined radius value, and produces road information on acute curve in response to result of said comparing the radius of each of said curves with said predetermined radius value.

Figure 1:
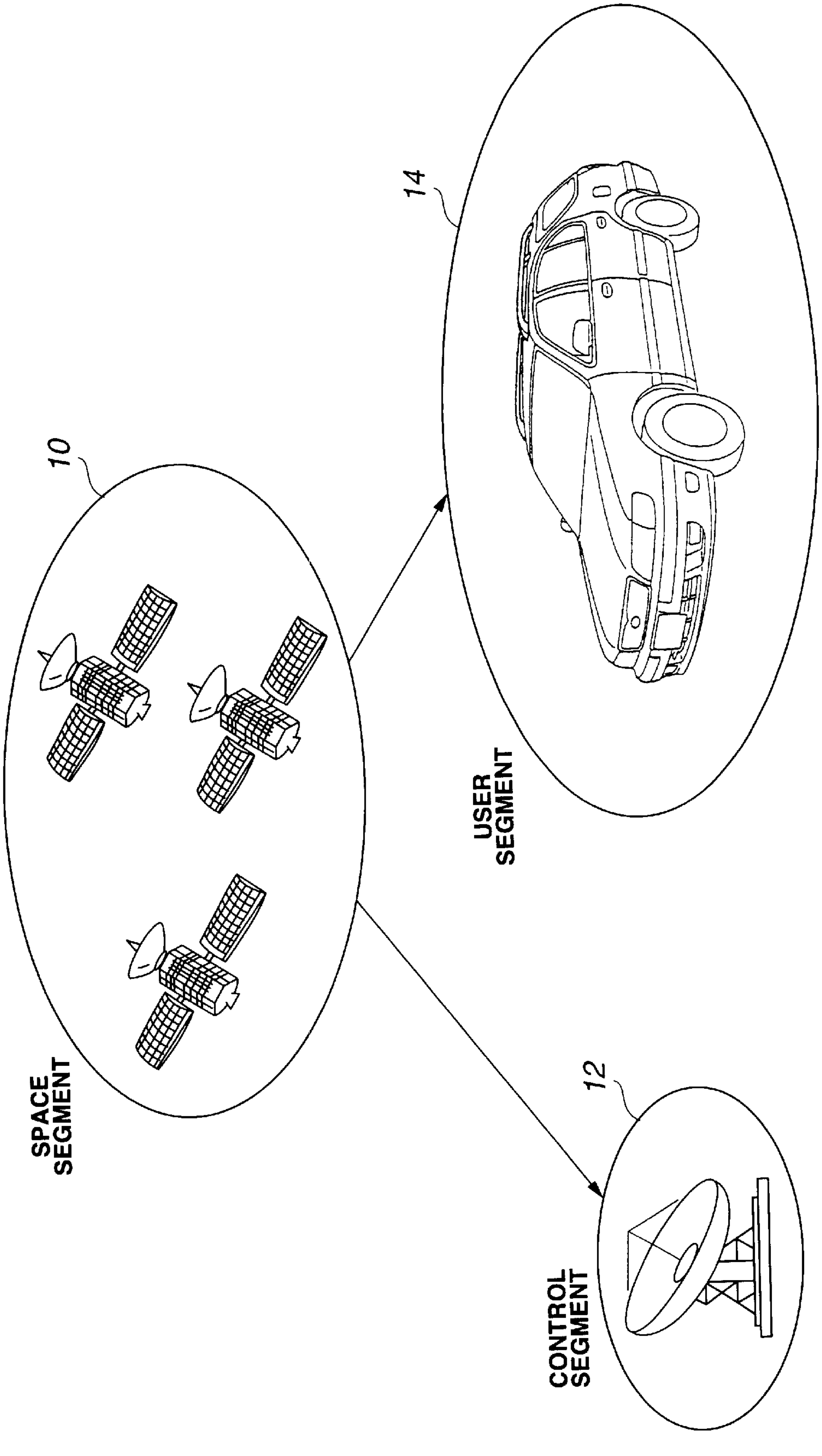
FIG. 1 is a general illustration of the various segments in the NAVSTAR GPS system.

While the invention is susceptible to various modifications and alternative forms, specifics thereof have been shown by way of example in the drawings and will be described in detail. It should be understood, however, that the intention is not limit the invention to the particular embodiment described. On the contrary, the intention is to cover all modifications, equivalents, and alternatives falling within the spirit and scope of the invention as defined by the appended claims.

DETAILED DESCRIPTION OF THE DRAWINGS

Current vehicle navigation systems use GPS to determine a vehicle's current position. Such a GPS system is the Navigation Satellite Timing and Ranging (NAVSTAR) Global Positioning System, which is a space-based satellite radio navigation system developed by the U.S. Department of Defense (DoD). GPS includes NAVSTAR GPS and its successors, Differential GPS (DGPS), or any other electromagnetic wave positioning systems. NAVSTAR GPS receivers provide users with continuous three-dimensional position, velocity, and time data.

NAVSTAR GPS consists of three major segments: Space, Control, and User as illustrated in FIG. 1. The space segment 10 consists of a nominal constellation of 24 operational satellites, which have been placed, in 6 orbital planes above the Earth's surface. The satellites are in circular orbits in an orientation that normally provides a GPS user with a minimum of five satellites in view from any point on Earth at any one time. The satellites broadcast an RF signal that is modulated by a precise ranging signal and a coarse acquisition code ranging signal to provide navigation data.

The navigation data, which is computed and controlled by the GPS control segment 12, includes the satellite's time, its correction and ephemeris parameters, almanacs, and health status for all GPS satellites. From this information, the user computes the precise position and clock offset The control segment 12 consists of a Master Control Station and a number of monitor stations at various locations around the world. Each monitor station tracks all the GPS satellites in view and passes the signal measurement data back to the master control station. There, computations are performed to determine precise satellite ephemeris and satellite clock errors. The master control station generates the upload of user navigation data from each satellite. This data is subsequently rebroadcast by the satellite as part of its navigation data message.

The user segment 14 is the collection of all GPS receivers and their application support equipment such as antennas and processors. This equipment allows users to receive, decode, and process the information necessary to obtain accurate position, velocity and timing measurements. This data is used by the receiver's support equipment for specific application requirements. GPS supports a wide variety of applications including navigation, surveying, and time transfer.

An illustrative embodiment of the road information generating apparatus according to the principles of the present invention is described below. In the interest of clarity, not all features of actual implementation are described in the specification It will of course be appreciated that in the development of any such actual implementation, numerous implementation specific decisions must be made to achieve developers' specific goals and sub goals, such as compliance with system- and business-related constraints, which will vary from one implementation to another. Moreover, it will be appreciated that such a development effort might be complex and time-consuming, but would nevertheless be a routine undertaking of device engineering for those of ordinary skill having the benefit of this disclosure.

Figure 2:
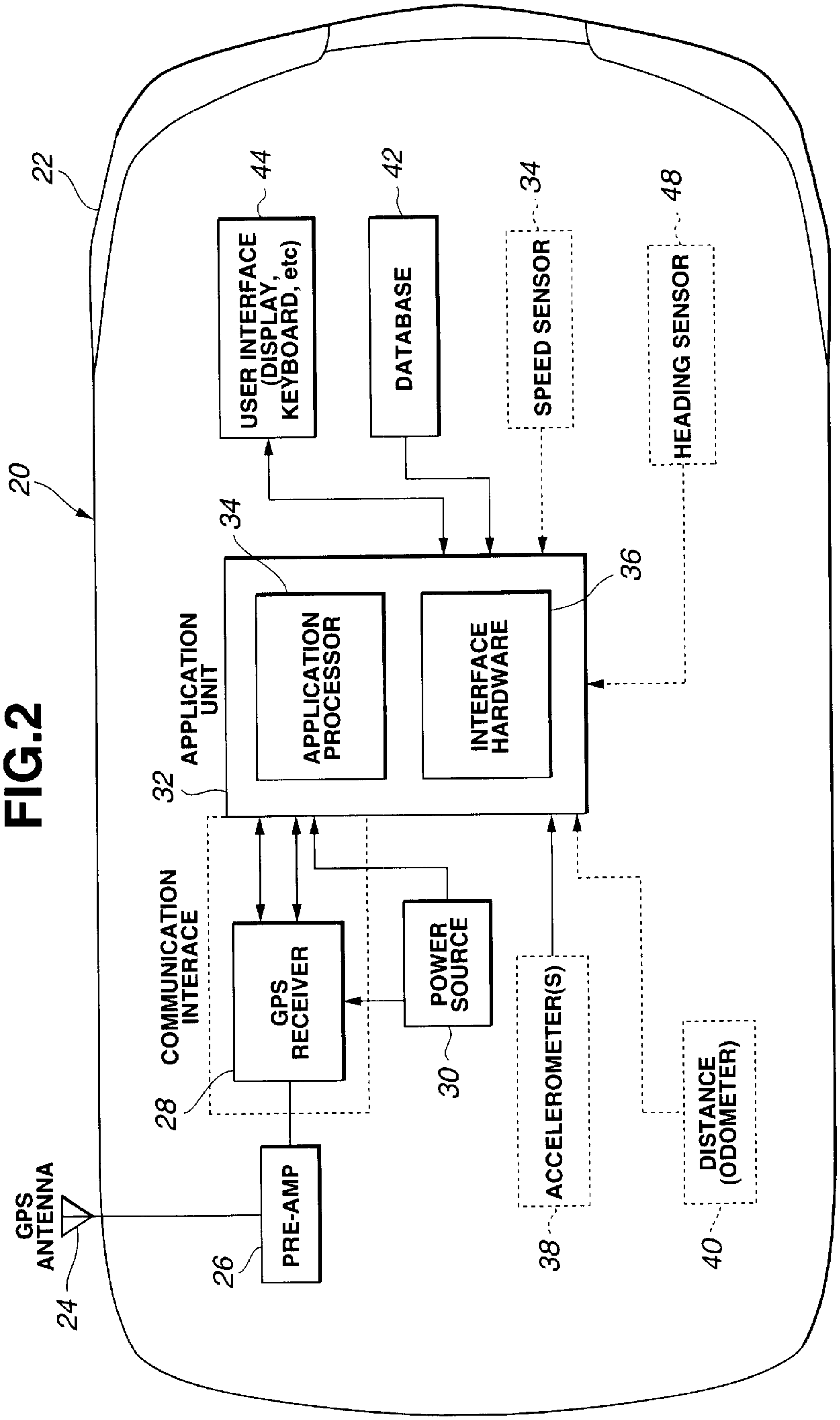
FIG. 2 shows a vehicle navigation system.

FIG. 2 illustrates, in block diagram form, an exemplary arrangement of a vehicle navigation system 20 for an automobile 22. The vehicle navigation system 20 uses a GPS antenna 24 to receive the GPS signals. The GPS antenna 24 can be connected to a pre-amplifier 26 to amplify the GPS signals received by the antenna 24. The pre-amplifier 26 is optional, and the GPS antenna 24 can be directly connected to a GPS receiver 28.

The GPS receiver 28 continuously determines geographic position by measuring the ranges (the distance between a satellite with known coordinates in space and the receiver's antenna) of several satellites and computing the geometric intersection of these ranges. To determine a range, the GPS receiver 28 measures the time required for the GPS signal to travel from the satellite to the receiver antenna 24. The timing code generated by each satellite is compared to an identical code generated by the GPS receiver 28. The receiver's code is shifted until it matches the satellite's code. The resulting time shift is multiplied by the speed of light to arrive at the apparent range measurement.

Since the resulting range measurement contains propagation delays due to atmospheric effects, and satellite and receiver clock errors, it is referred to as "pseudorange." Changes in each of these pseudoranges over a short period of time are also measured and processed by the GPS receiver 28. These measurements, referred to as delta range measurements or "delta-pseudoranges," are used to compute velocity. Delta ranges are in meters per second, which are calculated by the GPS receiver 28 from pseudoranges, and the GPS receiver 28 can track the carrier phase of the GPS signals to smooth out the pesudoranges. The velocity and time data is generally computed once a second. If one of the position components is known, such as altitude, only three satellite pseudorange measurements are needed for the GPS receiver 28 to determine its velocity and time. In this case, only three satellites need to be tracked.

The error in the range measurement is dependent on one of two levels of GPS accuracy to which the user has access. PPS is the most accurate, but is reserved for use by DoD and certain authorized users. SPS is less accurate and intended for general public use. The SPS signal is intentionally degraded to a certain extent by a process known as Selective Availability (SA). SA is used to limit access to the full accuracy of SPS in the interest of U.S. national security. Differential GPS (DGPS) may be used to correct certain bias-like errors in the GPS signals. A Reference Station receiver measures ranges from all visible satellites to its surveyed position. Differences between the measured and estimated ranges are computed and transmitted via radio and other signals to differential equipped receivers/hosts in a local area. Incorporation of these corrections into the range measurements can improve their position accuracy.

As shown in FIG. 2, the GPS receiver 28 provides GPS measurements to an application unit 32. The application unit 32 consists of application processing circuitry 34, such a processor, memory, busses, the application software and related circuitry and interface hardware 36.

The navigation system 20 can include a combination of the features, such as those shown in dashed lines. For example, the navigation system could rely upon information provided by the GPS receiver 28, an accelerometer 38 and map database 42 to propagate vehicle position. According to another aspect, the navigation system 20 can use the accelerometer 38, an odometer 40 and the map database 42. According to other aspect, the navigation system 20 can include a speed sensor 46 and a heading sensor 48, such a gyro, compass or differential odometer.

Figure 3:
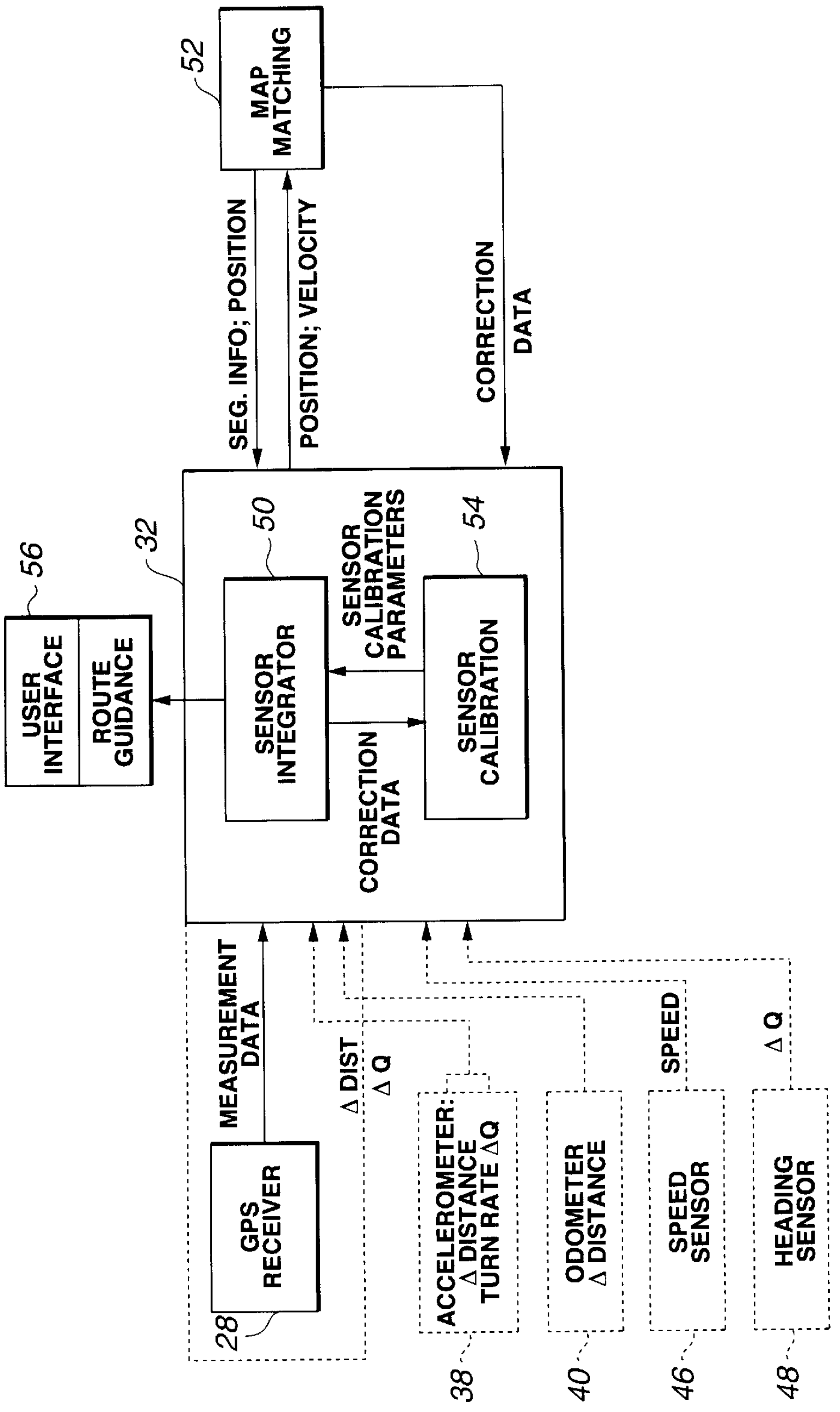
FIG. 3 shows a block/data flow diagram of the vehicle navigation system of FIG. 2.

FIG. 3 shows a block and data flow diagram for the navigation system 20. The GPS receiver 28 provides position information, velocity information, velocity information, pseudoranges and delta pseudoranges to a sensor integrator 50. The sensor integrator 50 uses the velocity information to determine a current position for the vehicle. If GPS velocity information is not available, the sensor integrator 50 can calculate GPS velocity using the available data range measurements to determine a current position for the vehicle. GPS velocity information is derived from a set of delta range measurements. If only a subset of delta range measurements is available, the navigation system 20 can derive GPS velocity information from the subset of delta range measurements. The navigation system uses the GPS position information at start-up as a current position and as a check against the current position. If the current position fails the check, then the GPS position can replace the current position.

If GPS velocity information is not available, the navigation system 20 can obtain information used to propagate the current position from the sensors. The accelerometer 38, which is a multiple axis accelerometer, provides acceleration information for at least two orthogonal axes (lateral, longitudinal and/or vertical) to the application unit 32. The odometer 40 provides information, which can be used in place of the information derived from the accelerometers. Other available information can include the odometer distance and GPS heading, a distance calculation and map heading, the GPS speed information and map heading, gyro heading and longitudinal speed and other variants.

A map database 42 stores map information, such as a road network, and provides map information to the application unit 32. A user interface 44, which includes a display and keyboard, allows interaction between the user and the navigation system 20.

In any event, if GPS is available or not, the sensor integrator 50 provides the current position and a velocity (speed and heading) to a map matching block 52. The map matching block 52 provides road segment information for the road segment that the vehicle is determined to be travelling on, such as heading, and a suggested position. The sensor integrator 50 can update the heading component of the velocity information with the heading provided by the map matching block 52 to update the current position. If the map matching block 52 indicates a good match, then the map matched position can replace the current position. If not, the sensor integrator 50 propagates the previous position to the current position using the velocity information. As such, the sensor integrator 50 determines the current position and provides the current position to a user interface and/or route guidance block 56.

The map matching block 52 also provides correction data, such as a distance scale factor and/or offset and a turn rate scale factor and/or offset, to a sensor calibration block 54. The sensor integrator 50 also provides correction data to the sensor calibration block 54. The correction data from the sensor integrator 50, however, is based on the GPS information. Thus, accurate correction data based on the GPS information is continuously available to calibrate the sensors 38 (2 or 3 axis accelerometer) as well as other sensors 40, 46 and 48. The correction data from the map matching block 52 may be ignored by the sensor calibration block 54 until a good match is found between the map information and the current position. If a highly accurate match is found by map matching 52, the map matched position is used as a reference point or starting position for position propagation.

The sensor calibration block 54 contains the sensor calibration parameters, such as scale factors and zero factors for the sensors 38 and 40 and provides the calibration parameters to the sensor integrator 50 to calibrate the sensors 38, 40, 46 and 48.

Figure 4:
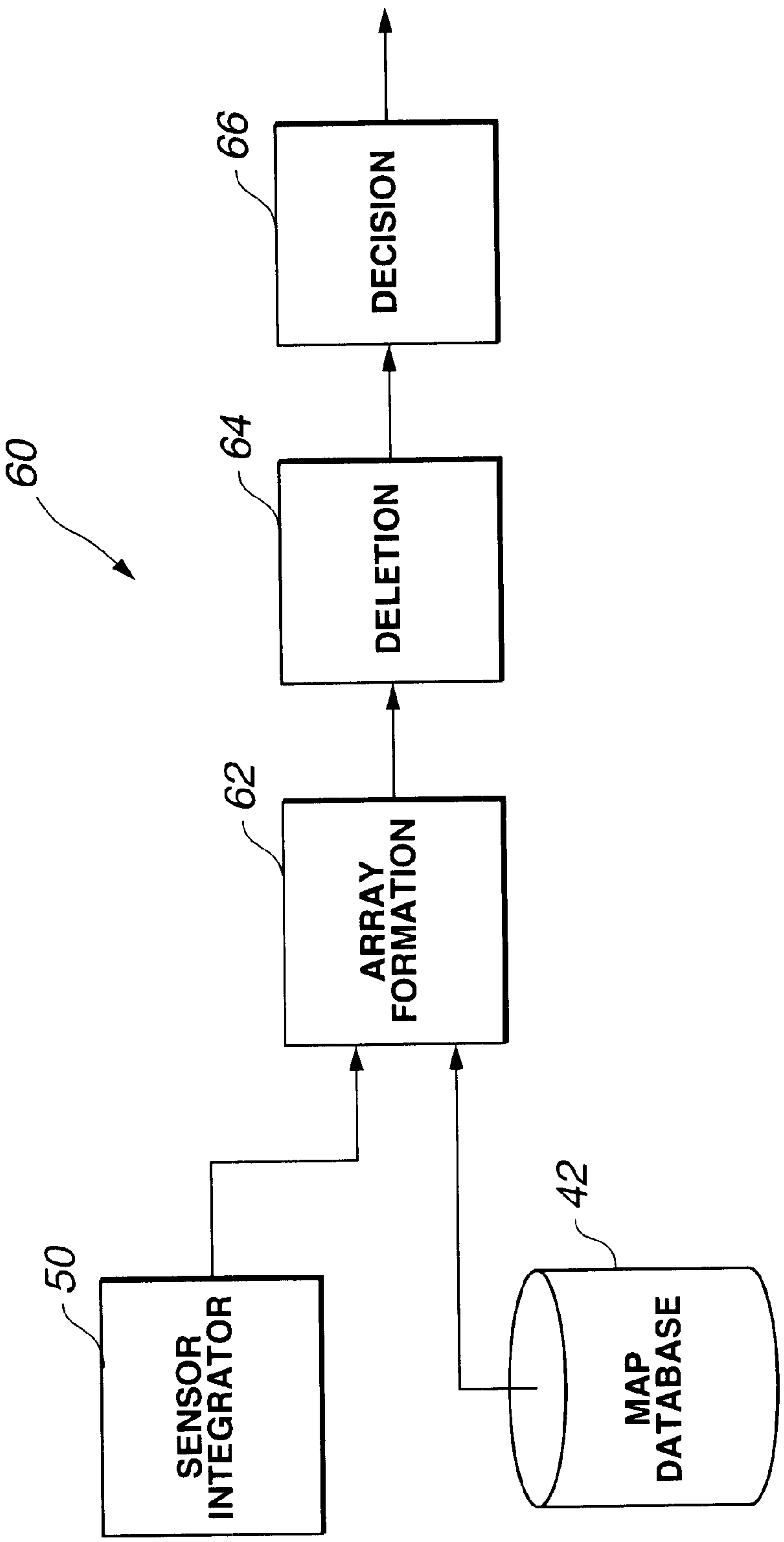
FIG. 4 shows a block/data flow diagram of a road information generating apparatus according to the present invention.

FIG. 4 shows a block and data flow diagram for an illustrative embodiment of the road information generating apparatus 60 according to the present invention. The road information generating apparatus 60 can be incorporated in the navigation system 20 of FIG. 2. Moreover, the road information generating apparatus 60 can be incorporated in an advanced driver information system that controls and provides information on a variety of automobile functions. However, the road information generating apparatus 60 can be implemented as an independent unit.

The sensor integrator 50 provides the vehicle current position information to an array formation block 62. The map database 42 has a network of roads. The roads of the map database 42 are stored as road segments. Each road segment has endpoints. Each endpoint is provided in geodetic coordinates (latitude, longitude, and altitude). These data are referred to as "point data." The endpoints are connected one after another by lines along road. Each line interconnecting the adjacent two endpoints defining a road segment is provided in length. These data are referred to as "line data." The array formation block 62 collects information at each of endpoints from the map database 42 along route that has been determined from the current position to a desired destination. Each piece of information collected as related to the leading or initiating endpoint of a road segment can be used as a road curve indicative variable. The array formation block 62 arranges collected pieces of information in an array and provides them to a deletion block 64. The deletion block 64 finds an endpoint interconnecting line that is longer than a threshold value and removes an endpoint to which the line is related. This threshold value derives from a predetermined radius of road curve. The other endpoints, which have passed through the deletion block 64, are fed to a decision block 66. The decision block 66 performs approximation of road curve by finding a circle interconnecting three, for example, adjacent endpoints of interconnected road segments, and determining that the road segments have tight curve when a radius of road curve is less than a threshold value. The array formation, deletion and decision blocks 62, 64 and 66 can be incorporated in the application unit 32 of the navigation system 20 (see FIG. 2). Other possibility is that they can be incorporated in an independent application unit that includes a processor composed of a central processor unit (CPU), a random access memory (RAM) and a read only memory (ROM).

Figure 5:
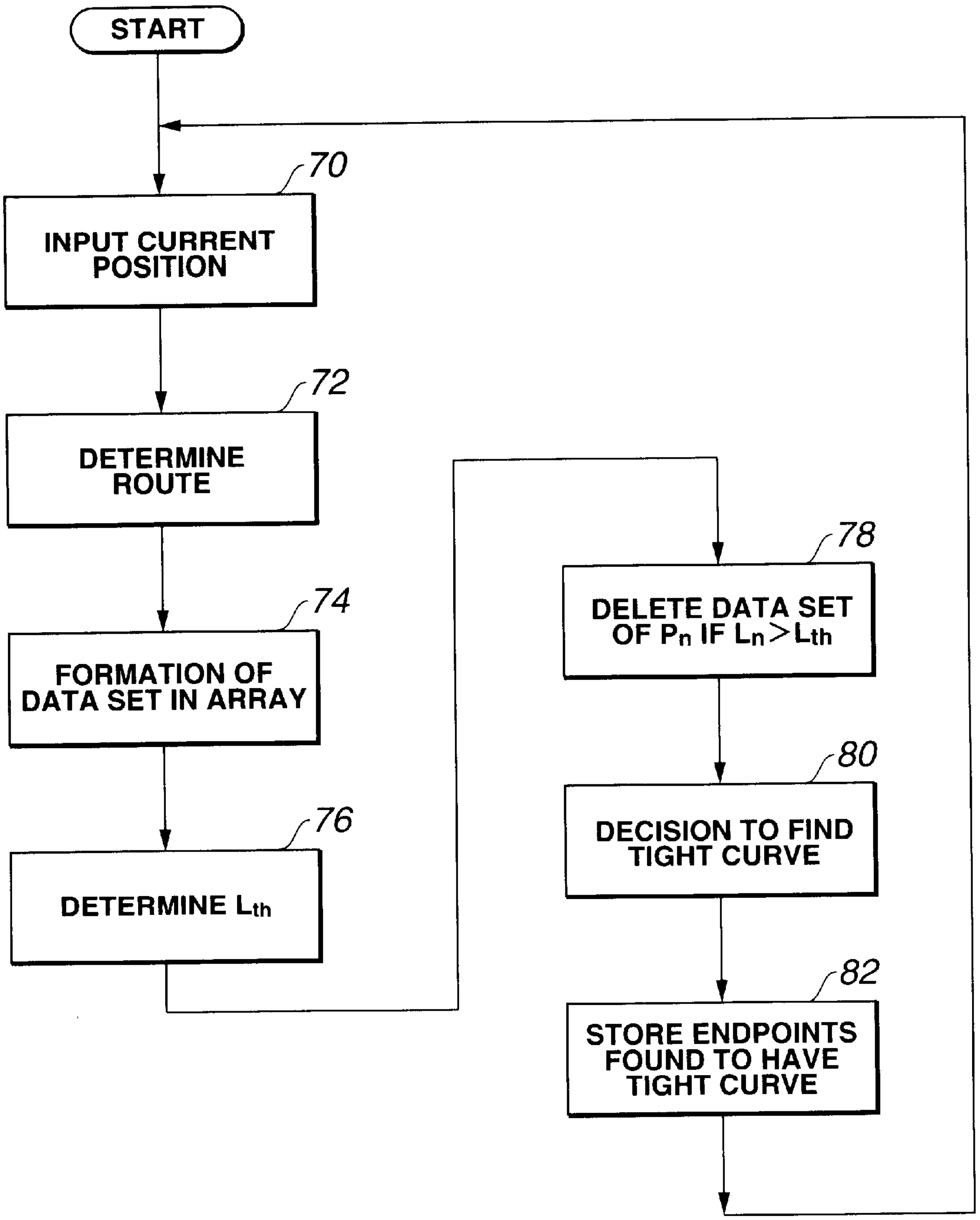
FIG. 5 shows a simplified general flow chart of the operation an embodiment of the road information generating apparatus of FIG. 4.
Figure 6:
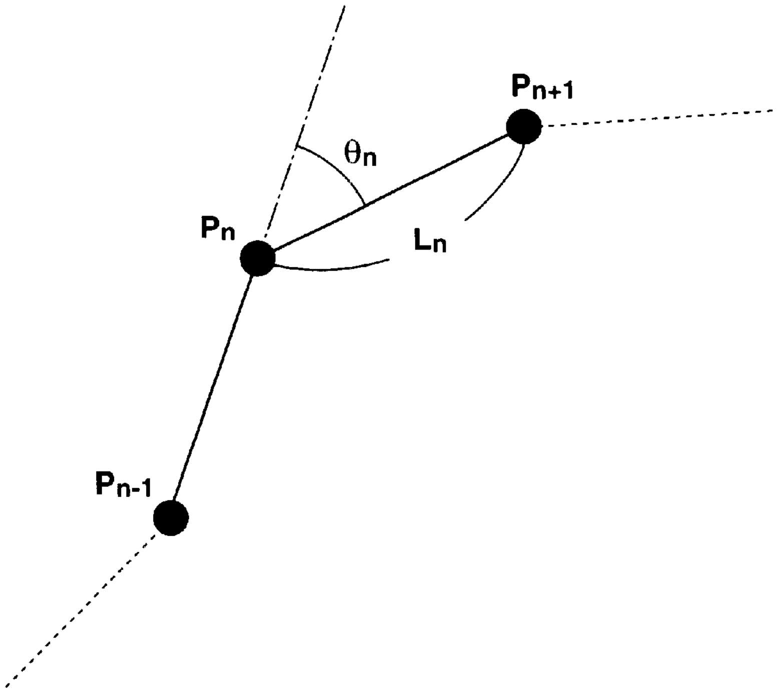
FIG. 6 shows a diagram illustrating how the road information generating apparatus obtains an azimuth angle at each of endpoints and the length of a line extending to the next adjacent endpoint.

FIG. 5 shows a general flow chart illustrating how the road information generating apparatus 60 using the deletion block 64 and the approximation technique in the decision block 66 outputs road information on where on the route tight curve exists. At step 70, the road information generating apparatus 60 inputs the current position. At step 72, the apparatus 60 determines a route from the current position to a desired destination. At step 74, the apparatus 60 uses information from the map database 42 and collects a set of data at each of endpoints of road segments forming a road network on the route and arrange the data sets in an array. Each data set includes an azimuth angle at an endpoint and the length of a line leading from the endpoint to the adjacent endpoint. FIG. 6 shows how the road information generating apparatus 60 obtains, at an endpoint $P_n$, an azimuth angle $\theta_n$ and the length $L_n$ of a line interconnecting the endpoint $P_n$ and the next adjacent endpoint $P_{n+1}$. The array of data sets can be expressed as, $$P_0(\theta_0, L_0), P_1(\theta_1, L_1), \ldots, P_{n-1}(\theta_{n-1}, L_{n-1}), P_n(\theta_n, L_n).$$

At the next step 76, the road information generating apparatus 60 determines a threshold value $L_{th}$ from a predetermined radius of road curve. At step 78, the road information generating apparatus 60 delete the data set at such an endpoint $P_n$ when the length of its line $L_n$ is greater than the threshold value $L_{th}$. The deleted data may be stored as a list. At step 80, the road information generating apparatus 60 determines that road segments has tight curve when a radius of a circle approximating the three, for example, adjacent endpoints is less than a threshold value. At step 82, the road information generating apparatus 60 stores the road segments defining endpoints found to have tight curve.

Figure 7:
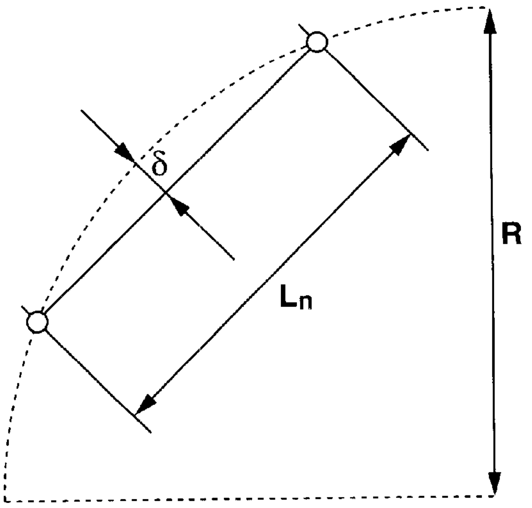
FIG. 7 shows a diagram illustrating an error between a line interconnecting the two adjacent endpoints and a circular arc interconnecting them.
Figure 8:
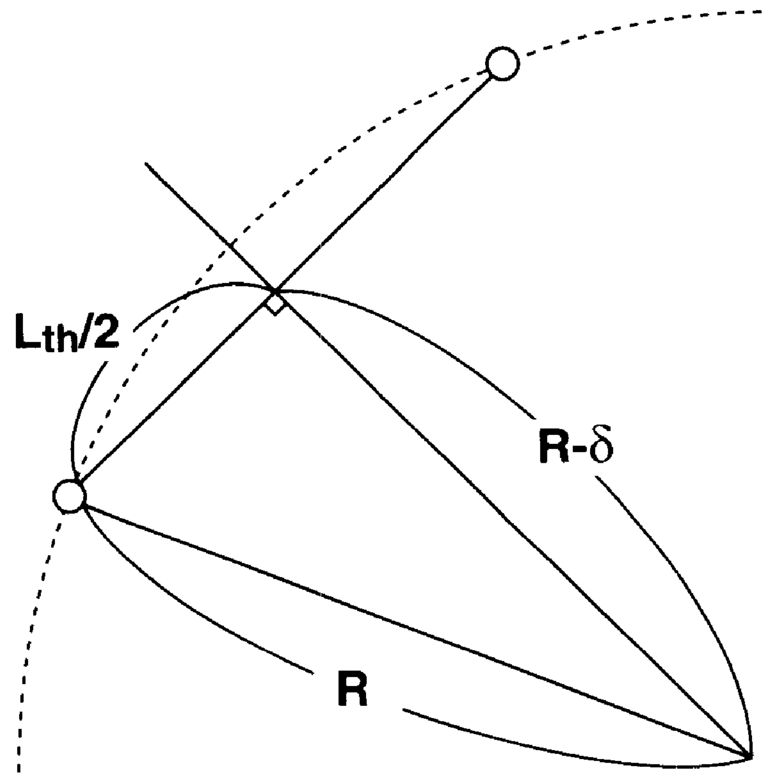
FIG. 8 shows a diagram illustrating how the road information generating apparatus determines a threshold value of the length of a line interconnecting the adjacent two-endpoints.

FIGS. 7 and 8 show diagrams how the road information generating apparatus 60 determines the threshold value $L_{th}$ of the length of a line interconnecting the two adjacent endpoints. FIG. 7 shows that there is an error δ, between the endpoint interconnecting circular and the endpoint interconnecting line, which grows as the length $L_n$ of the line becomes longer and longer. It clearly indicates that if the length of a line exceeds a predetermined value, it no longer represent a road segment having a road curve radius R. This predetermined value is the threshold value $L_{th}$.

FIG. 8 shows how to determine the threshold value $L_{th}$ from the threshold value R of road curve radius and the error δ. The following relation holds,]

$$(L_{th}/2)^2+(R-\delta)^2=R^2 \qquad (1).$$

Then, the threshold value $L_{th}$ can be expressed as, $$L_{th}=\sqrt{(8R\delta-4\delta^2)} \qquad (2).$$

If, for example, the error δ=2 m and the threshold value of road curve radius R=250 m, then $$L_{th}=\sqrt{(8\times250\times2-4\times2^2)}\approx63.1 \text{ m} \qquad (3).$$

This equation (3) clearly indicates that if the length of a line exceeds 63.1 m, a road segment, which this line represents, could have a road curve radius greater than the threshold value of road curve radius 250 m. The equation (2) shows that the error δ and the threshold value of road curve radius R determine the threshold value $L_{th}$ of a line.

The error δ and the road curve radius threshold valve R can be kept invariable over the entirety of route, over which the vehicle may move. However, they may be varied in response to variations in width or type of road.

Figure 9:
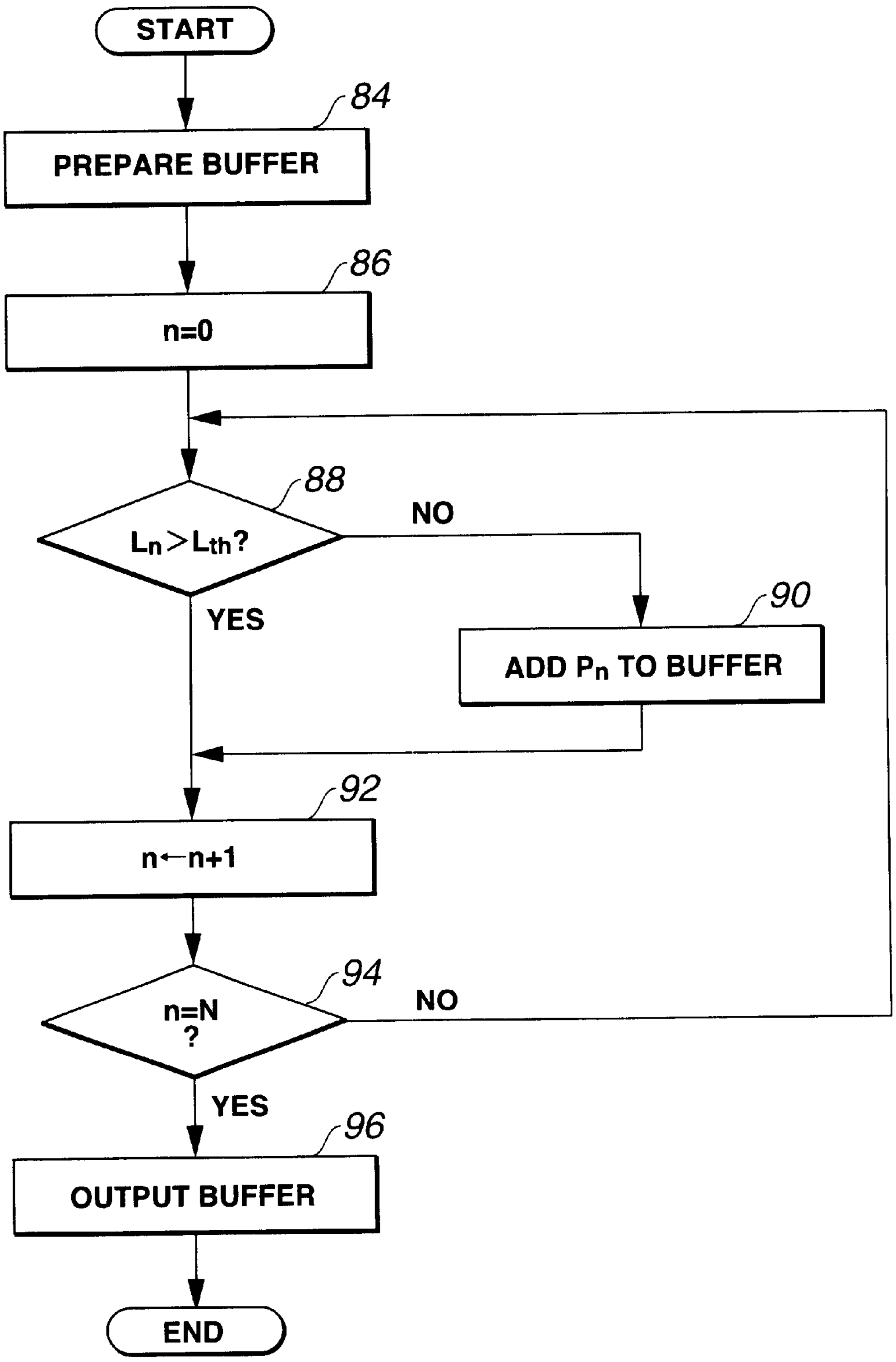
FIG. 9 is a simplified general flow chart of the operation of the road information generating apparatus of FIG. 4.

FIG. 9 is a flow chart illustrating the operation of the deletion block 64 of the road information generating apparatus of FIG. 4. In this flow chart, the threshold value $L_{th}$ is compared to the length $L_n$ of each line interconnecting the adjacent two endpoints, and delete the endpoint whose line has length greater than $L_{th}$.

In FIG. 9, at step 84, the road information generating apparatus 60 prepares a buffer that is used to transfer input data to the decision block 66 (see FIG. 4). At step 86, the road information generating apparatus 60 initializes the subscript n by setting n equal to 0 (zero). At interrogation step 88, the road information generating apparatus 60 determines whether or not the length $L_n$ of the nth line is greater than the threshold value $L_{th}$. If this is not the case and $L_n \leqq L_{th}$, then the road information generating apparatus 60 adds the associated endpoint $P_n$ to the buffer at step 90. If this is the case and $L_n > L_{th}$, then the road information generating apparatus 60 increases the subscript n by 1 (one) at step 92. In this case, the associated endpoint $P_n$ is not added to the buffer and thus deleted. At the next interrogation 94, the road information generating apparatus 60 determines whether or not the subscript n is equal to the final or maximum value N of the array. If, at step 94, the subscript n is still less than the final value N, the road information generating apparatus 60 repeats steps 88, 90 and 92. If, at step 94, the subscript n is equal to the final value N, the road information generating apparatus 60 outputs stored data in the buffer to the decision block 66 (see FIG. 4).

The content of the buffer is composed of point data of such endpoints whose line length are less than or equal to the threshold value $L_{th}$. The road information generating apparatus 60 performs approximation of road curve by finding a circular arc interconnecting three, for example, adjacent endpoints of interconnected road segments, and determining that the road segments have tight curve when a radius of road curve is less than a threshold value, In determining tight curve, the deleted endpoints are not considered because road curve around each of such endpoints is gradual or near straightforward and cannot be considered as being tight. Road configuration around each of the deleted endpoints can be considered as gradual curve approximating a straightforward road.

With regard to the operation at the decision block 66 (see FIG. 4), if the array of endpoints on a route, each of which has a line length less than the threshold value $L_{th}$, are expressed by $P_0, P_1, \ldots, P_n$, the road information generating apparatus 60 can find a circle interconnecting any three consecutive endpoints $P_{n-1}$, $P_n$, $P_{n+1}$. The radius of this circle can be determined based on the coordinates of the three endpoints. This radius can be considered as a road curve radius of road segments defined by the three endpoints. If this curve radius is less than the threshold value, the road information generating apparatus 60 determines that these road segments have acute curve.

In the case where more than three consecutive endpoints are used for calculation, a radius of road curve can be obtained by finding a circular arc that minimizes the root-sum-square of errors δ.

In another embodiment, the road information generating apparatus 60 calculates sum of azimuth angles at endpoints defining road segments and sum of lengths of lines interconnecting the endpoints to determine a ratio between the sum of azimuth angles and the sum of the line lengths. This ratio is named an azimuth angle per unit line length. The road information generating apparatus 60 determines a reference azimuth angle per unit line length of a standard circle having a radius to be used as a threshold radius value. The road information generating apparatus 60 can compare the azimuth angle per unit line length with the reference azimuth angle per unit line length. In response to the result of this comparison, the road information generating apparatus 60 determines that the road segments have acute curve when the azimuth angle per unit line length is greater than the reference azimuth angle per unit line length.

Figure 10:
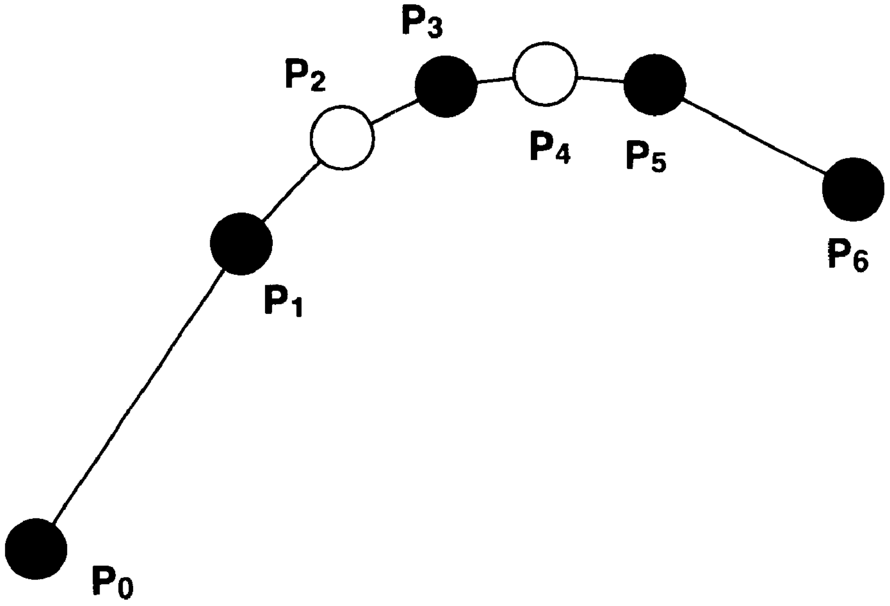
FIG. 10 shows a diagram illustrating the case where the road information generating apparatus can disregard some of consecutively arranged endpoints.

FIG. 10 shows the case where the road information generating apparatus 60 may disregard some of consecutively arranged endpoints $P_0$ to $P_6$ in determining whether or not road segments have acute curve. In this case, the road information generating apparatus 60 can disregard two endpoints $P_2$ and $P_4$ because they add to little information needed for creating the configuration of the road segments.

Figure 11:
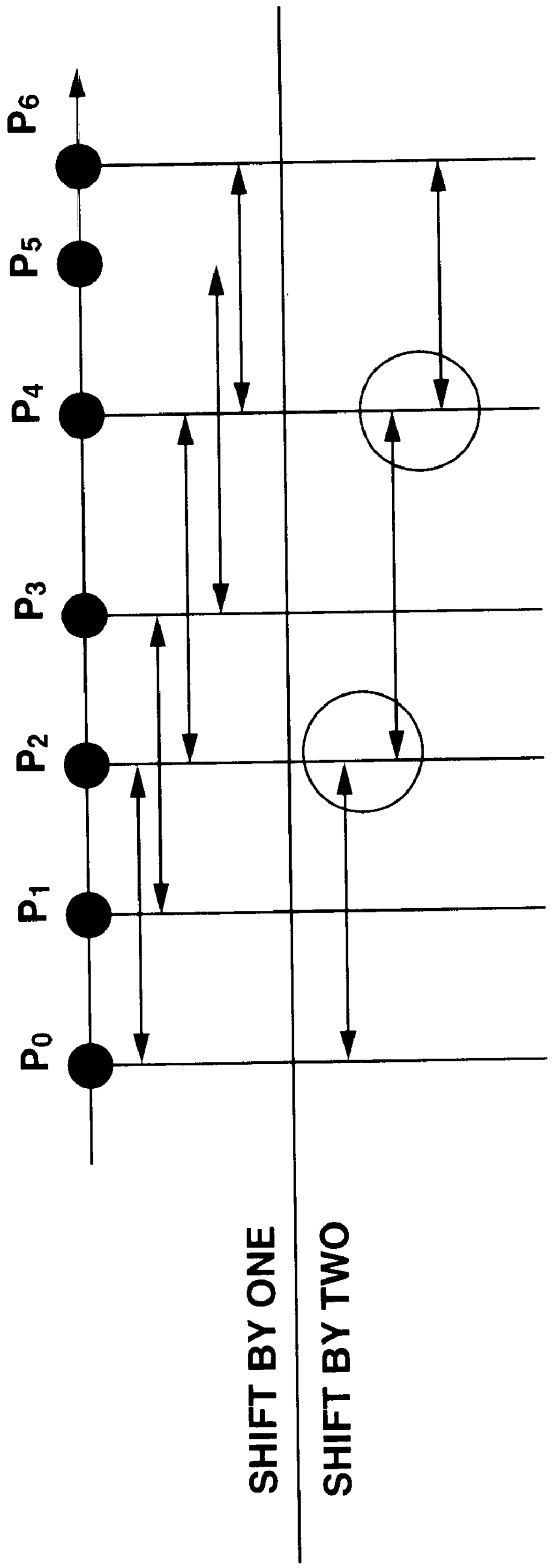
FIG. 11 shows a diagram illustrating how the road information generating apparatus can shift an array of endpoints if the number of endpoints to be examined is three, wherein an upper half shows a shift by one, whereas a lower half shows a shift by two.

FIG. 11 shows a diagram illustrating why the road information generating apparatus 60 should shift an array of endpoints $P_0$ to $P_6$ by one if three consecutive endpoints are to be examined. If, as shown by the lower half portion of FIG. 11, the road information generating apparatus shifts the array of endpoints by two, it fails to examine azimuth angles at the endpoints $P_2$ and $P_4$ for determination of the presence of acute angle.

Figure 12:
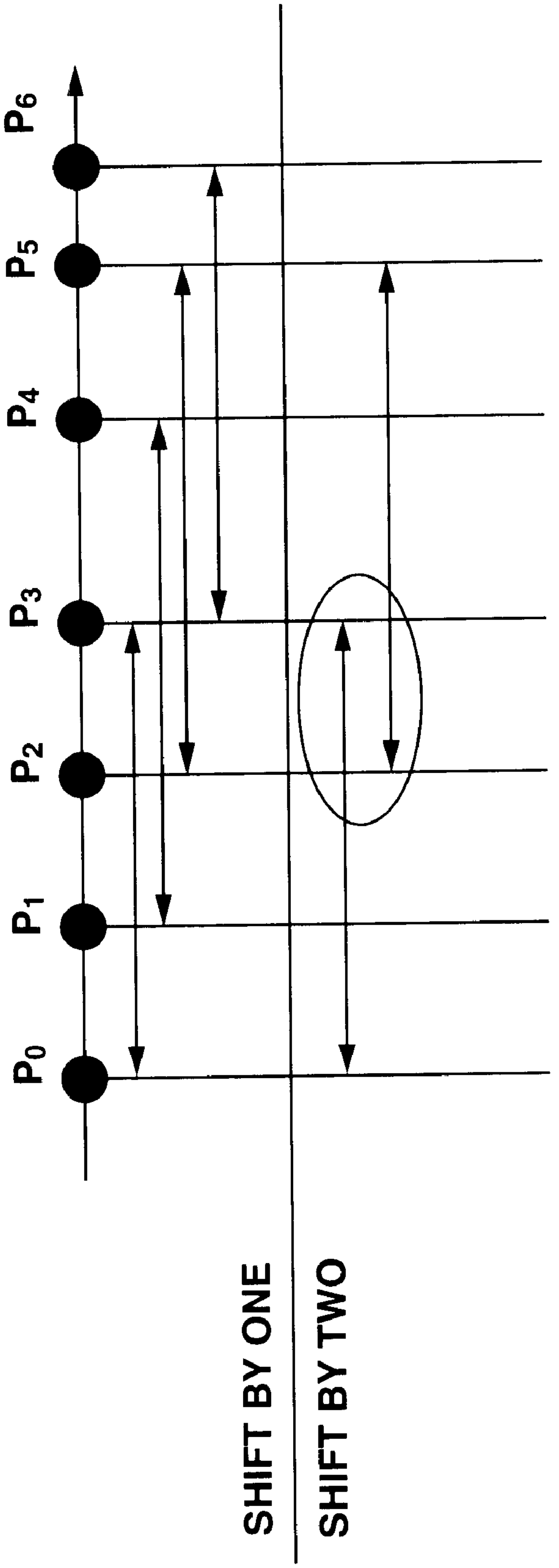
FIG. 12 shows a diagram illustrating how the road information generating apparatus can shift an array of endpoints if the number of endpoints to be examined is four, wherein an upper half shows a shift by one, whereas a lower half shows a shift by two.

FIG. 12 shows a diagram illustrating how the road information generating apparatus 60 can shift an array of endpoints by two if four consecutive endpoints are examined for determination of the presence of acute curve. The lower half of FIG. 12 clearly indicates that the road information generating apparatus can examine all of the endpoints because there is overlap between the adjacent two ranges of covering the endpoints. In general, fit the number n of endpoints to be examined is more than three, the road information generating apparatus can determine the presence of acute curve by shifting the array of endpoints by at most (n−2). The number of frequency of conducting process to determine the presence of acute curve drops.

The road information generating apparatus 60 can vary the number of endpoints, a set of sampled endpoints and the presence or absence of disregarding some of the endpoints in response to width of road, types or kinds of road and a threshold road curve value.

From the preceding description, it is apparent that since such endpoints, each having a considerably long line length, have been deleted, the precision of determining as to the presence of acute curve is improved or enhanced.

Figure 13:
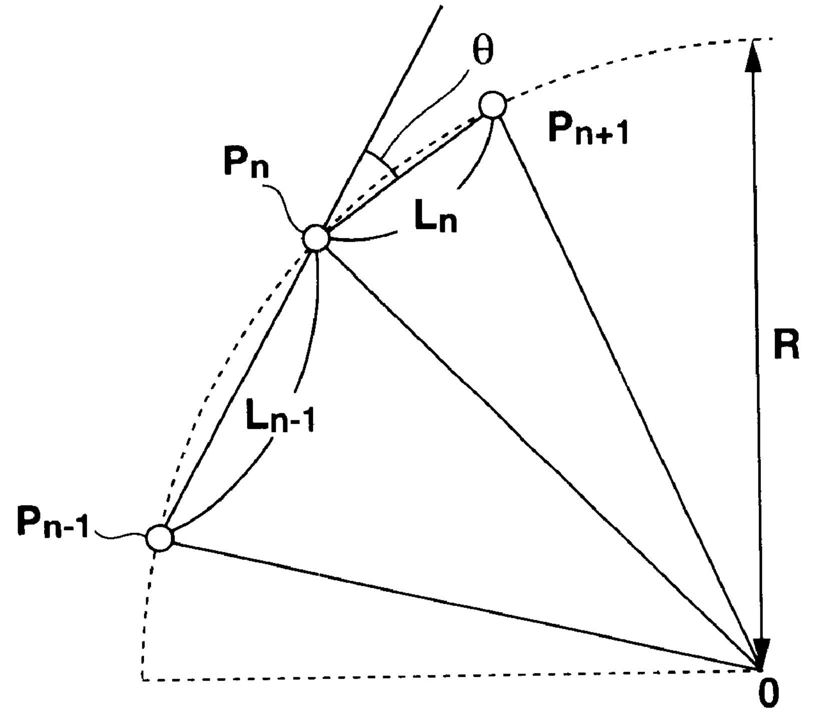
FIG. 13 shows a diagram illustrating how the road information generating apparatus determines a threshold value for comparison to each azimuth angle.
Figure 14:
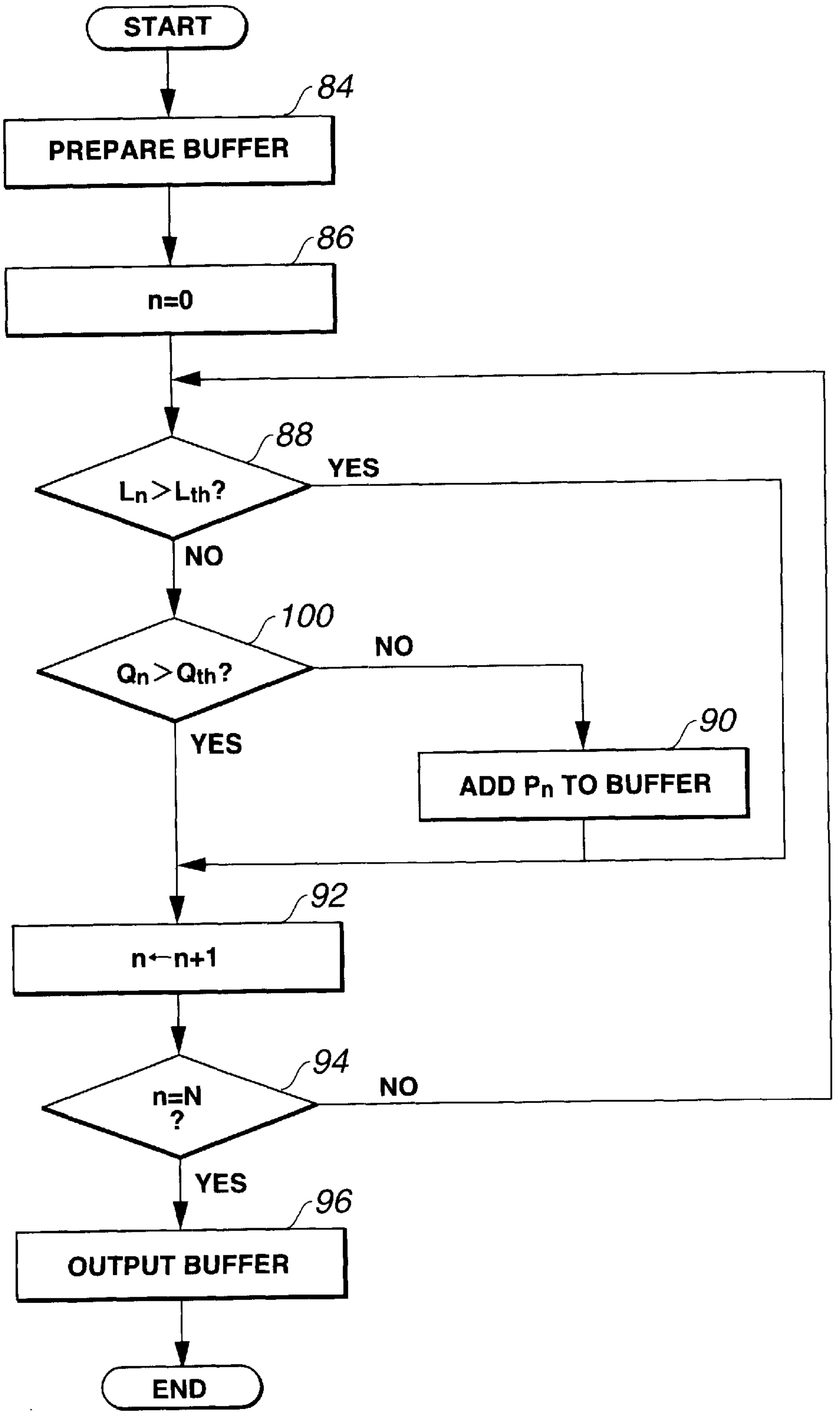
FIG. 14 is a similar flow chart to that of FIG. 9, illustrating the operation of the road information generating apparatus.

Referring to FIGS. 4, 13 and 14, description is made on another preferred implementation of a road information generating apparatus according to the present invention. This preferred implementation is substantially the same as the preferred implementation of FIG. 4 except the operation of the deletion block 64. According to this implementation, an azimuth angle at each endpoint is compared with a threshold value for deleting an endpoint or endpoints if its or their azimuth angles are less than its threshold value. In one embodiment, this comparison of the azimuth angles with their threshold value replaces the comparison of the line lengths with their threshold value. In other embodiment, the deletion block 64 uses the comparison of the azimuth angles with their threshold value in addition to comparison of the line lengths with their threshold value.

FIG. 13 shows a diagram illustrating three consecutive endpoints on a reference circle having a radius R. This circle is predetermined and used for calculating a threshold value $\theta_{th}$. As illustrated in FIG. 13, an azimuth angle θ at an endpoint $P_n$ is defined between an extension of a line $L_{n-1}$ that interconnects endpoints $P_{n-1}$ and $P_n$ and a line $L_n$ that interconnects endpoints $P_n$ and $P_{n+1}$. The azimuth angle $\theta_n$ can be expressed as $$\theta=180-\angle OP_nP_{n-1}-\angle OP_nP_{n+1} \qquad (4).$$

Assuming that the line $L_{n-1}$ and a circular arc $P_{n-1}P_n$ have substantially the same length, the angle $\angle OP_nP_{n-1}$ can be expressed by the following equation, $$\begin{aligned}\angle OP_nP_{n-1} &= (1/2)\times(180-\angle P_{n-1}OP_n) \\ &= (1/2)\times\{180-(180L_{n-1}/\pi R)\} \\ &= 90\times\{1-(L_{n-1}/\pi R)\}.\end{aligned} \qquad (5)$$

The angle $\angle OP_nP_{n+1}$ can be expressed as $$\angle OP_nP_{n+1}=90\times\{1-(L_n/\pi R)\} \qquad (6).$$

Substituting the equations (5) and (6) into the equation (4) gives $$\theta=\{90\times(L_{n-1}+L_n)\}/\pi R \qquad (7).$$

Accordingly, if the current azimuth angle $\theta_n$ at the endpoint $P_n$ is less than this angle θ, a circle interconnecting these three endpoints $P_{n-1}$, $P_n$ and $P_{n+1}$ has a radius greater than R. In this case, it is theoretically true that the road segments defined by these endpoints always take a curve less acute than the curve of the circle having the radius R.

It is impractical to regard all of the stored endpoints expressed by the coordinate frame indicate exactly points on a central longitudinal line of a road. Thus, it is practical to provide a threshold value an allowance within a range from several percent to 30% of the threshold value. If a coefficient a represents the allowance, the threshold value $\theta_{th}$ can be expressed as $$\theta_{th}=\alpha\theta=\{90\alpha\times(L_{n-1}+L_n)\}/\pi R \quad (8),$$

where: α is a value failing in a range from 1.0 to 1.3. Accordingly, the road information generating apparatus 60 determines that the road segments defined by the endpoints $P_{n-1}$, $P_n$ and $P_{n+1}$ have less acute curve than the curve of the reference circle having the radius R when the azimuth angle $\theta_n$ has the following relation $$\theta_n<\theta_{th}=\alpha\theta \quad (9).$$

The road information generating apparatus can alter or vary the allowance α in response to width of road and types or kinds of road. For example, if a road is considerably wide, the allowance α must take a large value taking into account a possible deviation from the central centerline of the road. In the case of a highway, the allowance α must take a small value because the endpoints correctly represent the contour of the highway.

The road information generating apparatus can delete such endpoints that have lines longer than the diameter 2R of the reference circle before comparison of azimuth angles with the threshold value, This is to ensure that the line $P_{n-1}P_n$ and the line $P_nP_{n+1}$ are located on the reference circle having the radius R. In an alternative version, the road information generating apparatus can incorporate deletion of such endpoints if the line lengths are long before further deletion based on result of comparison of azimuth angles with their threshold value.

FIG. 14 is a flow chart illustrating the operation of the deletion block 64 (see FIG. 4) of the second preferred implementation. This flow chart is substantially the same as that of FIG. 9 so that the same reference numerals as used in FIG. 9 are used to designate similar steps. Only difference is the provision of an interrogation step 100 within a logical flow from a step 88 toward a step 90.

If, at step 88, $L_n$ is greater than $L_{th}$, the endpoint is deleted. If, at step 88, $L_n$ is not greater than $L_{th}$, the road information generating apparatus determines, at step 100, whether or not $\theta_n$ is greater than $\theta_{th}$. If, at step 100, $\theta_n$ is greater than $\theta_{th}$, the endpoint is deleted. If, at step 100, $\theta_n$ is not greater than $\theta_{th}$, the endpoint is added to buffer at step 90.

The road information generating apparatus may remove step 88 of the flow chart in FIG. 12.

Referring to FIGS. 15 to 18, description on a third preferred implementation of a road information generating apparatus 60A is made. In each of the preceding embodiments the decision block 66 incorporates circular arc approximation type logic to determine whether or not acute curve is present. The road information generating apparatus 60A has a first decision block 104 and a second decision block 106. A selector 108 is provided to render appropriate one of the first and second decision blocks 104 and 106 operable. The second decision block 106 incorporates the circular arc approximation type logic to determine whether or not acute angle curve is present. The first decision block 104 incorporates azimuth angle type logic, which will be described later in connection with FIG. 17, to determine whether or not acute curve is present.

Figure 15:
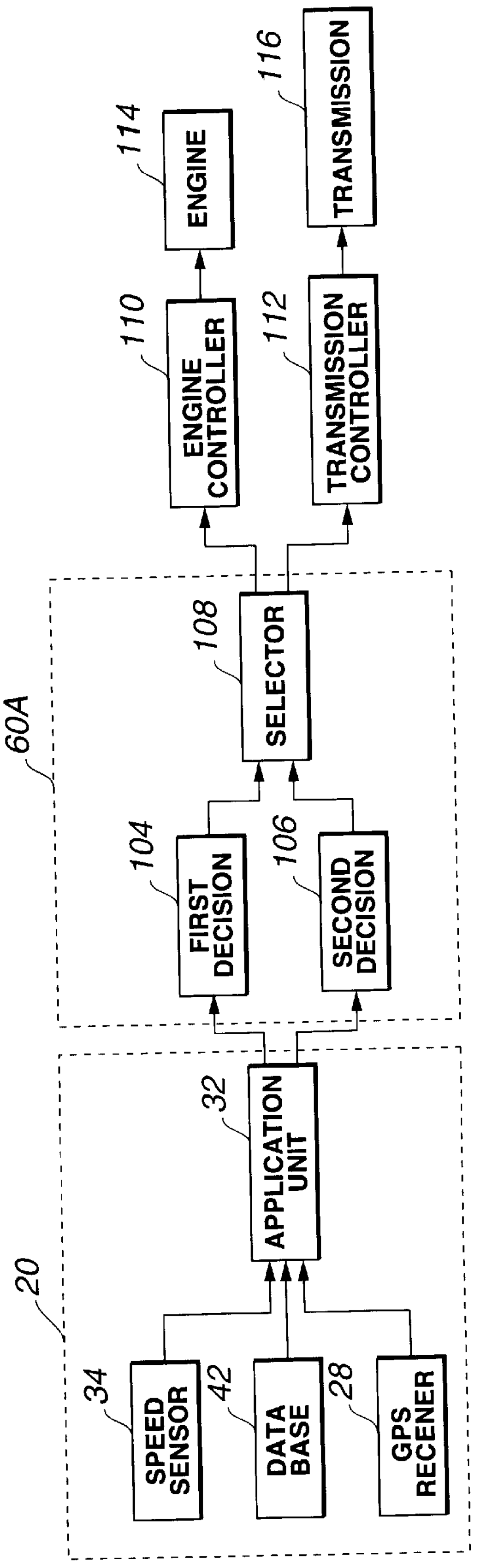
FIG. 15 is a block/flow diagram of a road information generating apparatus in association with a navigation system, an engine controller and a transmission controller.

Comparing FIG. 15 to FIG. 4 reveals that the road information generating apparatus 60A is substantially the same as the road information generating 60 except that two different pieces of logic are selectively used. In FIG. 15, only feature distinct is highlighted. Thus, the road information generating apparatus 60A incorporates the data array formation and the data deletion block in the same manner as in the road information generating apparatus 60.

The road information generating apparatus 60A uses the circular arc approximation type logic when travelling on highways and uses the azimuth angle type logic under the other travelling circumstance. The term "highways" herein used does not include a toll road network in Tokyo, called "Shuto Express Way" because it is narrow and has acute curves. The term "highways", however, includes such major roads, each having a wide width without any acute curve and toll roads even if they are not labeled as express ways. The database 42 provides enough information on each of roads to the selector 108.

Output indicative of results of the circular arc approximation type logic conduced at the first decision block and output indicative of result of the azimuth angle type logic conducted at the second decision logic are selectively applied to an engine controller 110 for an engine 114 and also to a transmission controller 112 for an automatic transmission. When acute curve is present, the engine controller 110 and the transmission controller 112 cooperate with each other to lower driving force before entering the acute curve.

Figure 16:
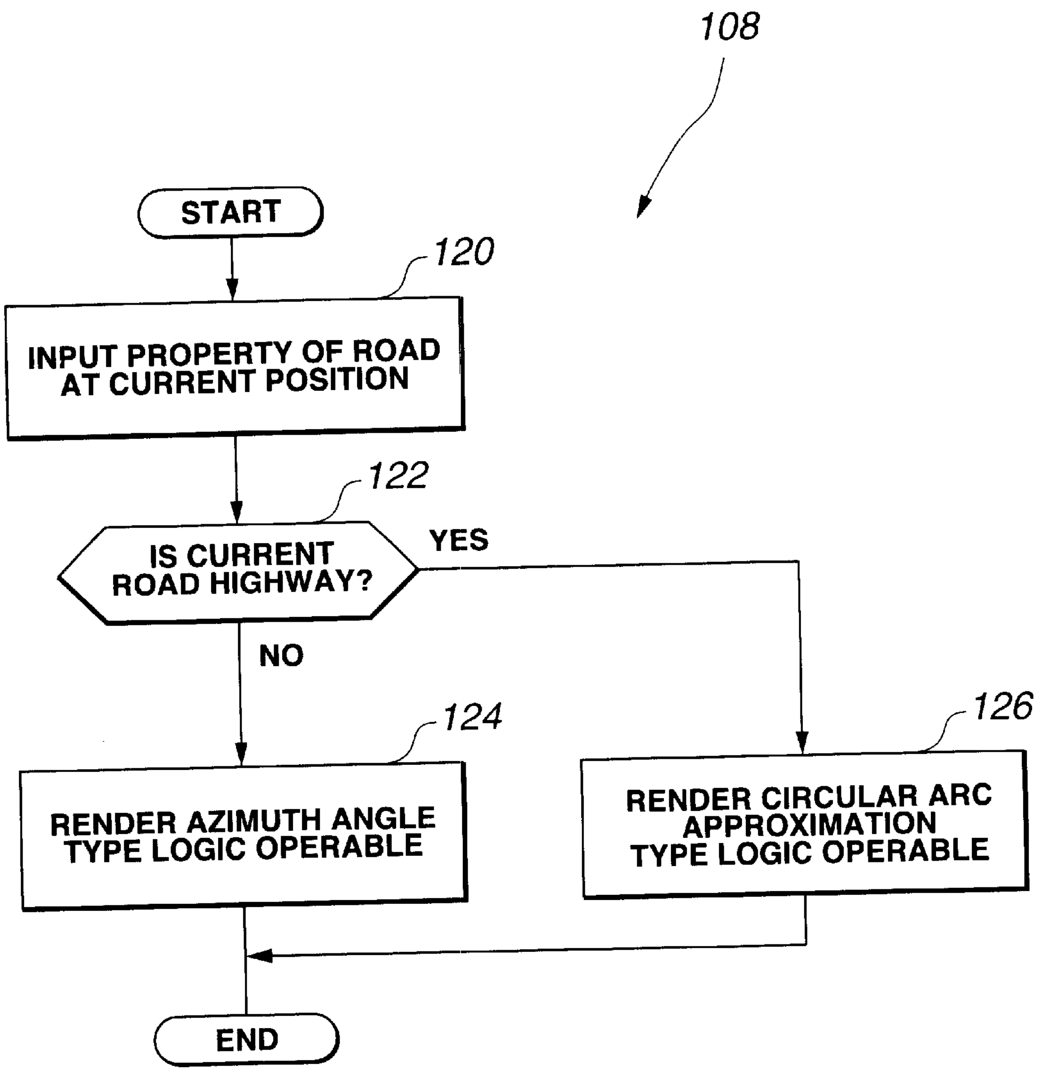
FIG. 16 is a flow chart illustrating operation of the road information generating apparatus of FIG. 15.

FIG. 16 shows a flow chart illustrating the operation of the selector 108 of the road information generating apparatus 60A. At step 120, the road information generating apparatus 50A inputs property of a current road on which a vehicle is travelling from the map database 42. The property is added to each road. All the roads are categorized by highways, toll roads, major roads and local streets. At step 122, the road information generating apparatus 60A determines whether or not the current road belongs to "highway." If, at step 122, this is the case, the road information generating apparatus 60A renders the circular arc approximation type logic operable at step 126 (at the second decision block 106). If, at step 122, this is not the case, the road information generating apparatus 60A renders the azimuth angle type logic operable at step 124 (at the first decision block 104).

Figure 17:
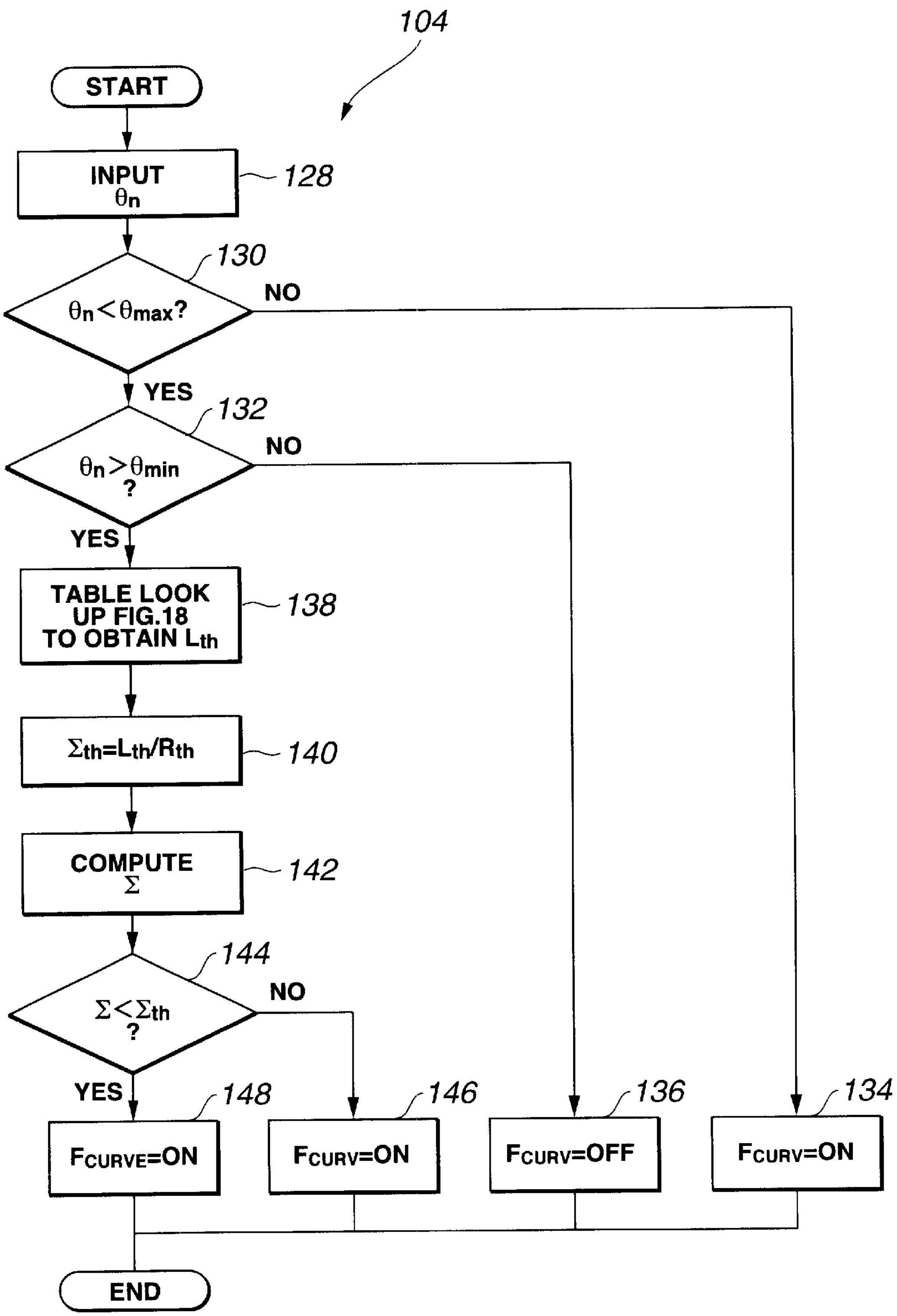
FIG. 17 is a flow chart illustrating an azimuth angle type logic that is suitable for use upon travelling on ordinary road.

FIG. 17 is a flow chart illustrating the azimuth angle type logic. At step 128, the road information generating apparatus 60A inputs an azimuth angle $\theta_n$ from the map database 42. At interrogation step 130, the road information generating apparatus 60A determines whether or not $\theta_n$ is less than an upper limit value $\theta_{max}$. The setting is such that the upper limit value $\theta_{max}$ is approximately 15°. If, at step 130, $\theta_n$ is less than the upper limit value $\theta_{max}$, the road information generating apparatus 60A determines, at interrogation step 132, whether or not $\theta_n$ is greater than a lower limit value $\theta_{min}$. The setting is such that the lower limit value $\theta_{min}$ is approximately 10°. Setting the upper and lower limit values $\theta_{max}$ and $\theta_{min}$ at 15° and 10° has proved to provide curve detection in good match to driver's perception. Naturally, the upper and lower limit values $\theta_{max}$ and $\theta_{min}$ may take any appropriate values depending upon map database, operation state and type of road.

If, at step 130, the azimuth angle $\theta_n$ is not less than the upper limit value $\theta_{max}$, the road information generating apparatus 60A sets, at step 134, curve flag $F_{CURV}$ equal to ON level. This is apparently the case where the road has acute curve. If, at step 132, the azimuth angle $\theta_n$ is not greater 30 than the lower limit value $\theta_{min}$, the road information generating apparatus 60A resets, at step 136, curve flag $F_{CURV}$ equal to OFF level. This is apparently the case where the road is straight.

Figure 18:
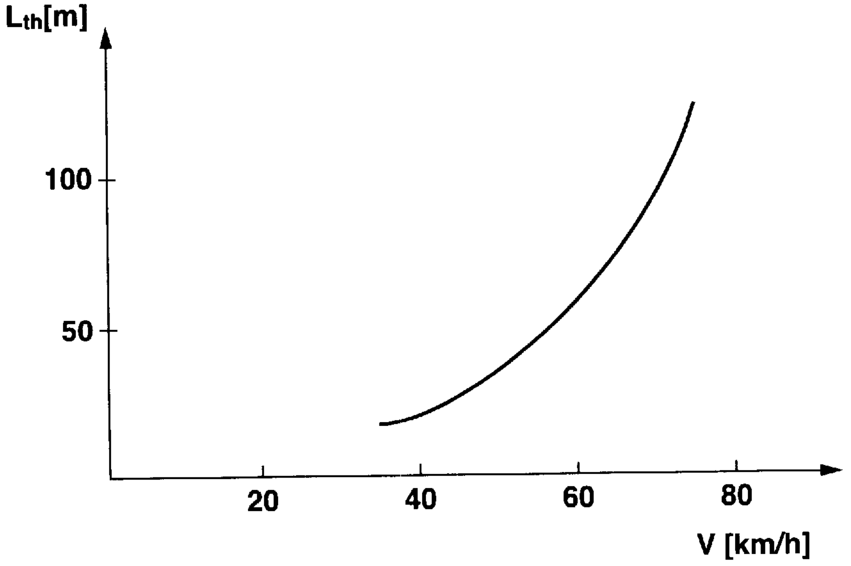
FIG. 18 is a graph illustrating the variation of a travelling distance of an automobile until its driver recognizes a curve on road against variation of speed.

If, at step 132, the azimuth angle $\theta_n$ is greater than the lower limit value $\theta_{min}$, the road information generating apparatus 60A performs a table look-up operation, at step 138, of FIG. 18 using vehicle sped V to obtain a preset value $L_{th}$. The fully drawn curve in FIG. 18 shows the variation of a travelling distance of an automobile vehicle until its driver recognizes a curve on the road against variation of travelling speed of the vehicle. Apparently, the travelling distance is not longer than 20 m at speeds below about 40 km/h. At speeds higher than about 40 km/h, the travelling distance increases as speed increases. The variation of this travelling distance is mapped as the preset value $L_{th}$ against variation of vehicle speed V.

At the nest step 140, the road information generating apparatus 60A computes a threshold value Σ that can be expressed by the following equation $$\Sigma_{th}=L_{th}/R_{th} \quad (1),$$

where: $R_{th}$ is the lower limit of radii of curves which an automobile can pass through without any considerable drop in travelling speed.

Figure 19:
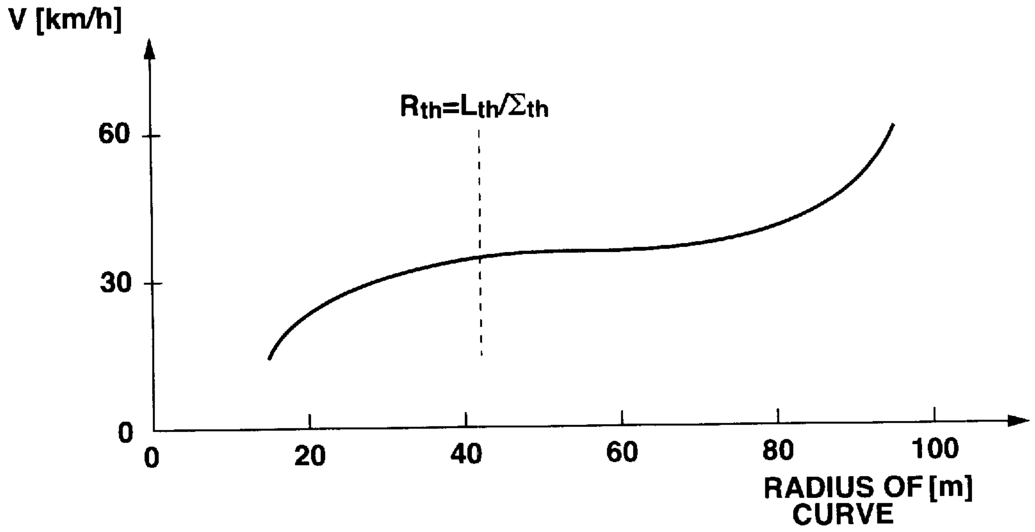
FIG. 19 is a graph illustrating the variation of a travelling speed of an automobile as its driver negotiates with a curve against variation of radius of a circle approximating a curve.

The radius of curve $R_{th}$ is given by the fully drawn curve in FIG. 19, The fully drawn line in FIG. 19 illustrates the variation of speed of an automobile as it passes through a road curve against the radii of circles approximating different road curves. Apparently, the travelling speed of the automobile decreases as the radius decreases. There is a radius around which the travelling speed drops considerably. This radius is set as the above-mentioned radius $R_{th}$.

At step 142, the road information generating apparatus 60A computes sum Σ of an azimuth angle $\theta_n$ at an endpoint $P_n$ to be measured and one or more azimuth angles $\theta_{n+1}$ . . . at the leading endpoints $P_{n+1}$ . . . , which are connected one after another by lines that amount, in length, to near the present value $L_{th}$.

At interrogation step 144, the road information generating apparatus 60A determines whether or not the sum Σ is less than the preset value $\Sigma_{th}$. If this is not the case, the road information generating apparatus 60A sets the curve flag $F_{CURV}$ equal to ON level. If this is the case, the road information generating apparatus 60A resets the curve flag $F_{CURV}$ equal to OFF level.

Figure 20:
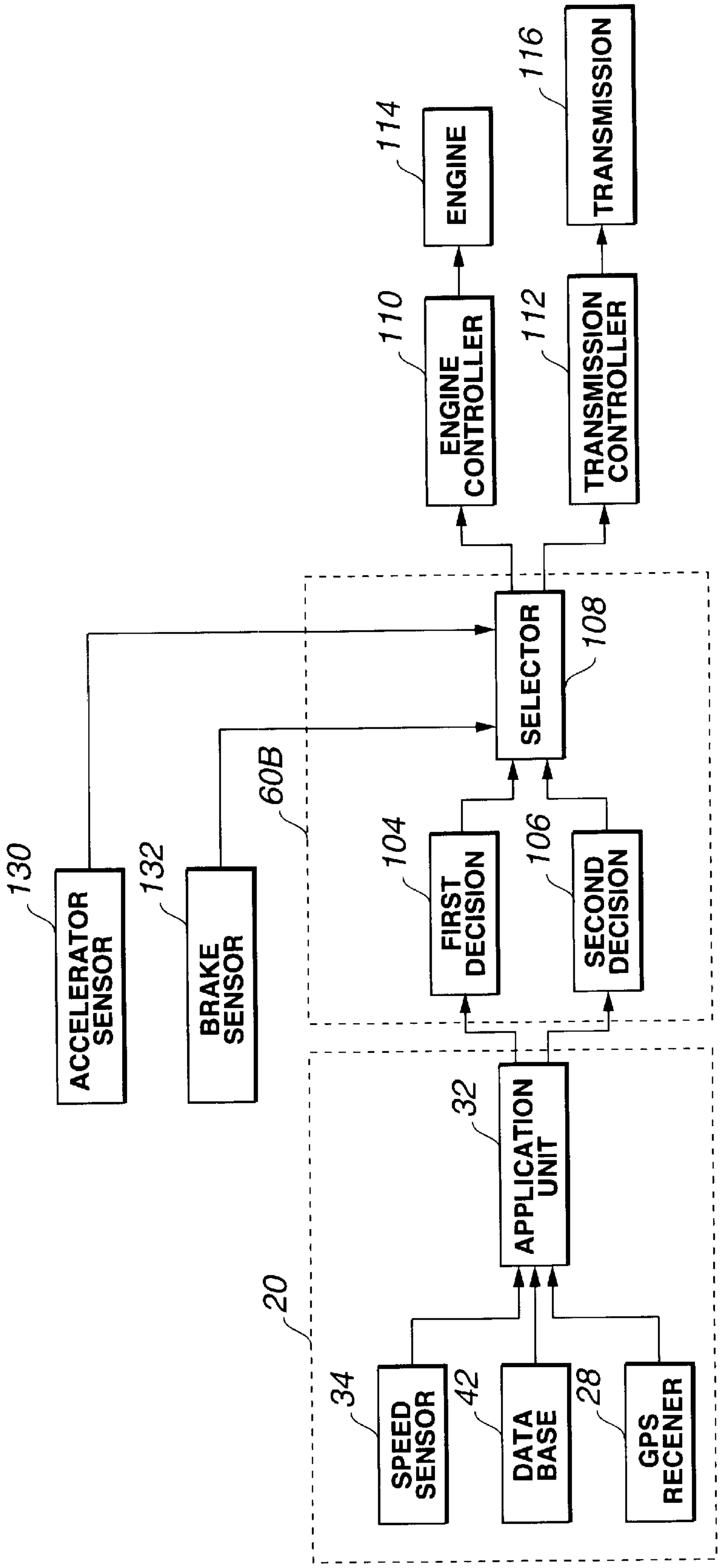
FIG. 20 is a similar view to FIG. 15 illustrating a modification where the verification process has been implemented.
Figure 21:
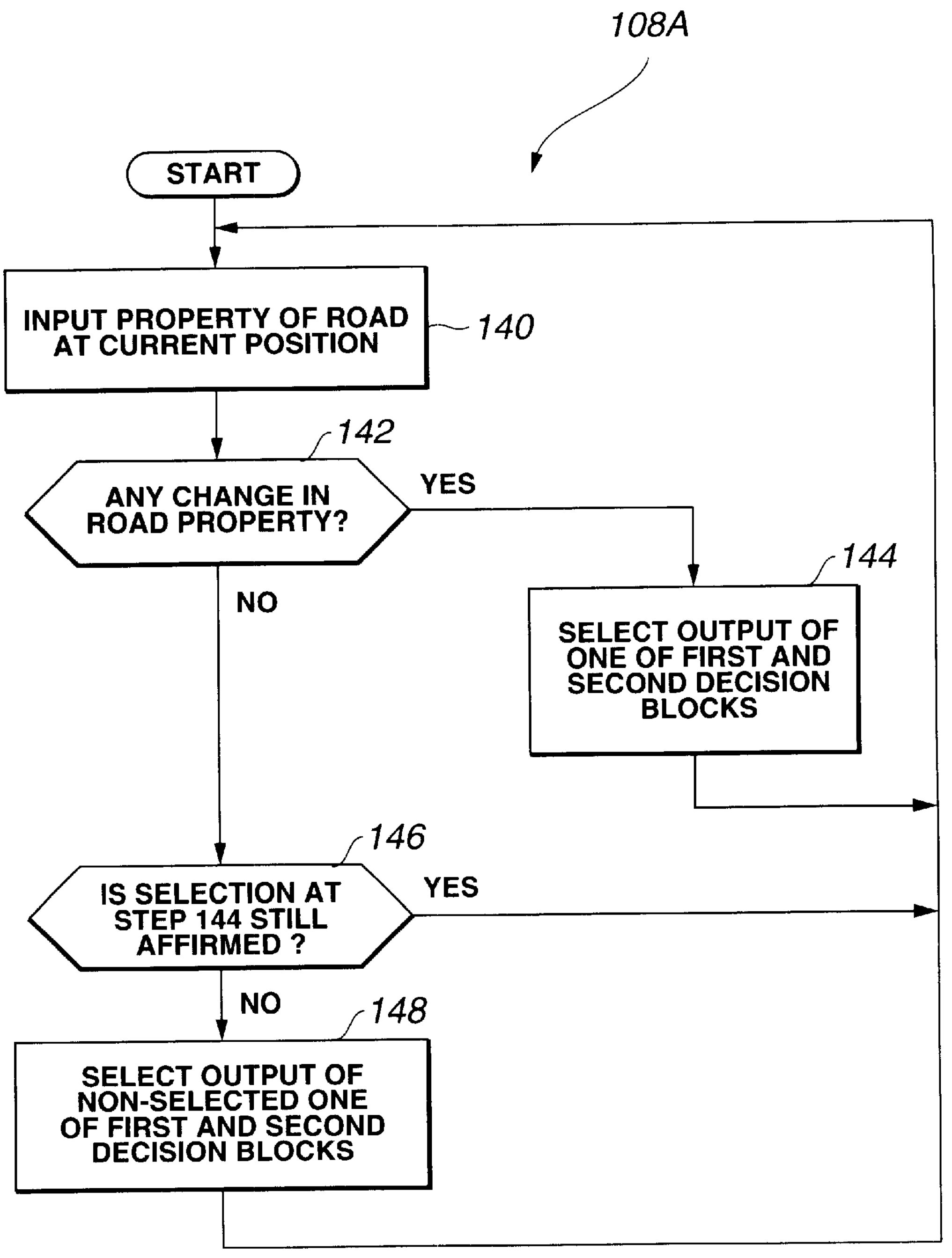
FIG. 21 is a simplified flow chart implementing the process of checking the result of selection against the perception by a driver of an automobile.

Referring to FIGS. 20 and 21, description is made on a modification of a road information generating apparatus 60B. The road information generating apparatus 60B is substantially the same as the previously described road information generating apparatus 60A except the implementation of the process of checking the result of selection by a selector 108A against the result of manual operation of a driver of an automobile. The driver's manual operation of an accelerator or gas pedal and a brake pedal is fed to the selector 108A through an accelerator pedal position sensor 130 and a brake sensor 132. The accelerator pedal position sensor 130 detects depression degree or position of the accelerator manipulated by the driver. The brake sensor 132 detects depression of the brake pedal by the driver.

If, at an endpoint measured, the selector 108A provides an indication of absence of any acute curve and the driver depresses the brake pedal immediately after release of the accelerator pedal, the driver perceives acute curve ahead on the road, the selection by the selector 108A is an error.

If, at an endpoint measured, the selector 108A provides an indication of the presence of acute curve and the driver has depressed the accelerator pedal immediately after release of the accelerator pedal, the selection by the selector 108A is an error.

FIG. 21 is a flow chart illustrating the operation of the selector 108A. At step 140, the road information generating apparatus 60B inputs property of road from a map database 42 in a similar manner to the process at step 120 of FIG. 108.

At step 142, the current result of reading operation at step 140 is stored as the previous property. At this step 142, the road information generating apparatus 60B compares the current road property to the previous road property and determines whether or not there is any change in road property. Initially, there is no stored road property as the previous result, the interrogation result of step 142 becomes affirmative (YES).

If the interrogation at step 142 results in affirmative, the road information generating apparatus 60B selects, at step 144, the appropriate one of azimuth angle type logic (at first decision block 104) and circular arc approximation type logic (at second decision block 106).

If the interrogation at step 142 results in negative, the road information generating apparatus 60B checks, at step 146, the selection result at step 144 against the manipulation behavior of a driver to determine whether or not the selection result at step 144 should sill be affirmed. At step 146, the selection result is checked against the driver's manipulation behavior through the accelerator pedal switch 130 and the brake switch 132.

If the selection at step 144 indicates the absence of any acute curve and the driver depresses the brake pedal immediately after release of the accelerator pedal, the road information generating apparatus 60B recognizes the occurrence of an error because the driver has perceived the presence of acute curve.

If the selection at step 144 indicates the presence of acute curve and the driver has depressed the accelerator pedal immediately after release of the accelerator pedal, the road information generating apparatus 60B recognizes the occurrence of an error because the driver has perceived the absence of acute curve.

After determination at step 146 of the occurrence of error, the road information generating apparatus 60B selects, at step 148, non-selected one of the azimuth angle type logic and circular arc approximation type logic. Preferably, the number or frequency of occurrence of errors are stored to use as a guide for the road information generating apparatus 60B goes from step 146 to step 148. This technique is effective in suppressing unnecessary switch operation.

While the present invention has been particularly described in conjunction with the preferred implementation and examples, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The contents of disclosure of Japanese Patent Application No. 11-173642, filed Jun. 21, 1999, and No. 2000-153065, filed May 25, 2000, are hereby incorporated by reference in their entireties.

What is claimed is:

1. An apparatus for generating road information on a route over which a vehicle may move, the apparatus comprising:

a stored map database having data identifying roads on the route, said roads of said stored map database being stored as road segments each having endpoints; and an application unit to implement a circular arc approximation type logic, which, when rendered operable, canels data defining selected road segments that fall outside of a predetermined window about a predetermined circle approximating a predetermined road curve, determines circles, each approximating a portion of non-selected road segments, compares a radius of each of said circles with a predetermined radius value, and produces road information on acute curve in response to result of said comparing the radius of each of said curves with said predetermined radius value.

2. The apparatus as claimed in claim 1, wherein said application unit is operative to generate a train of data sets for said road segments, respectively, each set including a trailing one of said endpoints defining one of said road segments, and a length of a link interconnecting said trailing one endpoint and a leading one of said endpoints defining said one road segment, wherein said application unit is operative to compare the length of each of said links with a predetermined value, and wherein said application unit is operative to consider whether or not each of said road segments follows a course that falls in said predetermined narrow window in response to the corresponding one of results of said comparison of the length of each of said links with said predetermined value.

3. The apparatus as claimed in claim 1, wherein said application unit is operative to generate a train of data sets for said road segments, respectively, each set including a trailing one of said endpoints defining one of said road segments, and an azimuth angle defined between a first link interconnecting said trailing one endpoint and a leading one of said endpoints defining said one road segment and a second link interconnecting said trailing one endpoint and a trailing one of endpoints defining the adjacent road segment succeeding said one road segment, wherein said application unit is operative to compare each of said azimuth angles with a predetermined value, and wherein said application unit is operative to consider whether or not each of said road segments follows a course that falls in said predetermined narrow window in response to the corresponding one of results of said comparison of each of said azimuth angles with said predetermined value.

4. The apparatus as claimed in claim 1, wherein said application unit is operative to generate a train of data sets for said road segments, respectively, each set including a trailing one of said endpoints defining one of said road segments, a length of a first link interconnecting said trailing one endpoint and a leading one of said endpoints defining said one road segment, and an azimuth angle defined between said first link and a second link interconnecting said trailing one endpoint and a trailing one of endpoints defining the adjacent road segment succeeding said one road segment, wherein said application unit is operative to compare the length of each of said links with a predetermined length value, wherein said application unit is operative to compare each of said azimuth angles with a predetermined angle value, and wherein said application unit is operative to consider whether or not each of said road segments follows a course that falls in said predetermined narrow window in response to a predetermined logic including the corresponding one of results of said comparison of the length of each of said links with said predetermined length value and the corresponding one of results of said comparison of each of the azimuth angles with said predetermined angle value.

5. The apparatus as claimed in claim 1, wherein said application unit is operative to generate a train of data sets for said road segments, respectively, each set including a trailing one of said endpoints defining one of said road segments, a length of a first link interconnecting said trailing one endpoint and a leading one of said endpoints defining said one road segment, and an azimuth angle defined between said first link and a second link interconnecting said trailing one endpoint and a trailing one of endpoints defining the adjacent road segment succeeding said one road segment, wherein said application unit is operative to implement an azimuth angle type logic, which, when rendered operable, calculates a sum of a plurality of said azimuth angles of a desired one of said endpoints and some of the other of said endpoints located within a predetermined distance from said desired one endpoint along the route, compares said calculated sum with a predetermined sum of angles, and produces information indicative of existence of a curved road in response to result of said comparing said calculated sum with said predetermined sum of angles, and wherein said application unit is operative to render one of said circular arc approximation type logic and said azimuth angle type logic operable and the other inoperable in response to at least road information stored in said stored map database and operator manipulated parameter information.

6. The apparatus as claimed in claim 5, wherein said application unit is operative to compare the corresponding one of said azimuth angles to said desired one of said endpoints, and to produce information indicative of existence of a straight road when the corresponding one azimuth angle is less than a predetermined minimum angle value.

7. The apparatus as claimed in claim 5, wherein said application unit is operative to compare the corresponding one of said azimuth angles to said desired one of said endpoints, and to produce information indicative of existence of a curved road when the corresponding one azimuth angle is greater than a predetermined maximum angle value.

8. The apparatus as claimed in claim 5, including a vehicle speed sensor to generate a vehicle speed signal indicative of traveling speed of the vehicle, wherein said predetermined distance is determined as a function of said vehicle speed signal, and said predetermined sum of angles is determined as a function of said predetermined distance.

9. The apparatus as claimed in claim 5, wherein said operator manipulated parameter information include operator manipulation to adjust the traveling speed of the vehicle.

10. The apparatus as claimed in claim 9, wherein said operator manipulation to adjust the traveling speed of the vehicle includes manipulation of one of an accelerator pedal and a brake pedal.

11. The apparatus as claimed in claim 9, wherein said operator manipulation t o adjust the traveling speed of the vehicle includes at least one of depression of an accelerator pedal immediately after release of said accelerator pedal and depression of a brake pedal.

12. An apparatus for generating road information on a route over which a vehicle may move, the apparatus comprising:

a stored map database having data identifying roads on the route, said roads of said stored map database being stored as road segments each having endpoints; and means operable to input data from said stored map database, said means being operative to cancel data defining selected road segments that fall outside of a predetermined window about a predetermined circle that approximates a predetermined road curve, to determine circles, each approximating a portion of unselected road segments, to compare a radius of each of said circles with a predetermined radius value, and to produce road information on acute curve in response to result of said comparing the radius of each of said curves with said predetermined radius value.

13. A method of generating road information on a route over which a vehicle may move, the method comprising:

preparing a digitized map database having data identifying roads on the route, said roads of said map database being stored as road segments each having endpoints;

canceling data defining selected road segments that fall outside of a predetermined window about a predetermined circle that approximates a predetermined road curve;

determining circles, each approximating unselected road segments;

comparing a radius of each said circles with a predetermined radius value; and producing road information on acute curve in response to result of said comparing the radius of each of said curves with said predetermined radius value.

14. An apparatus for generating road information on a route over which a vehicle may move, the method comprising:

means for storing a digitized map database having data identifying roads on the route, said roads of said map database being stored as road segments each having endpoints;

means for canceling data defining selected road segments that fall outside of a predetermined window about a predetermined circle that approximates a predetermined road curve;

means for determining circles, each approximating a portion of unselected road segments;

means for comparing a radius of each of said circles with a predetermined radius value; and means for producing road information on acute curve in response to result of said comparing the radius of each of said curves with said predetermined radius value.

* * * * *